Feb. 8, 1938. C. E. JOHNSON 2,107,481
WATER COOLED MOTOR
Filed Feb. 20, 1928 2 Sheets-Sheet 2

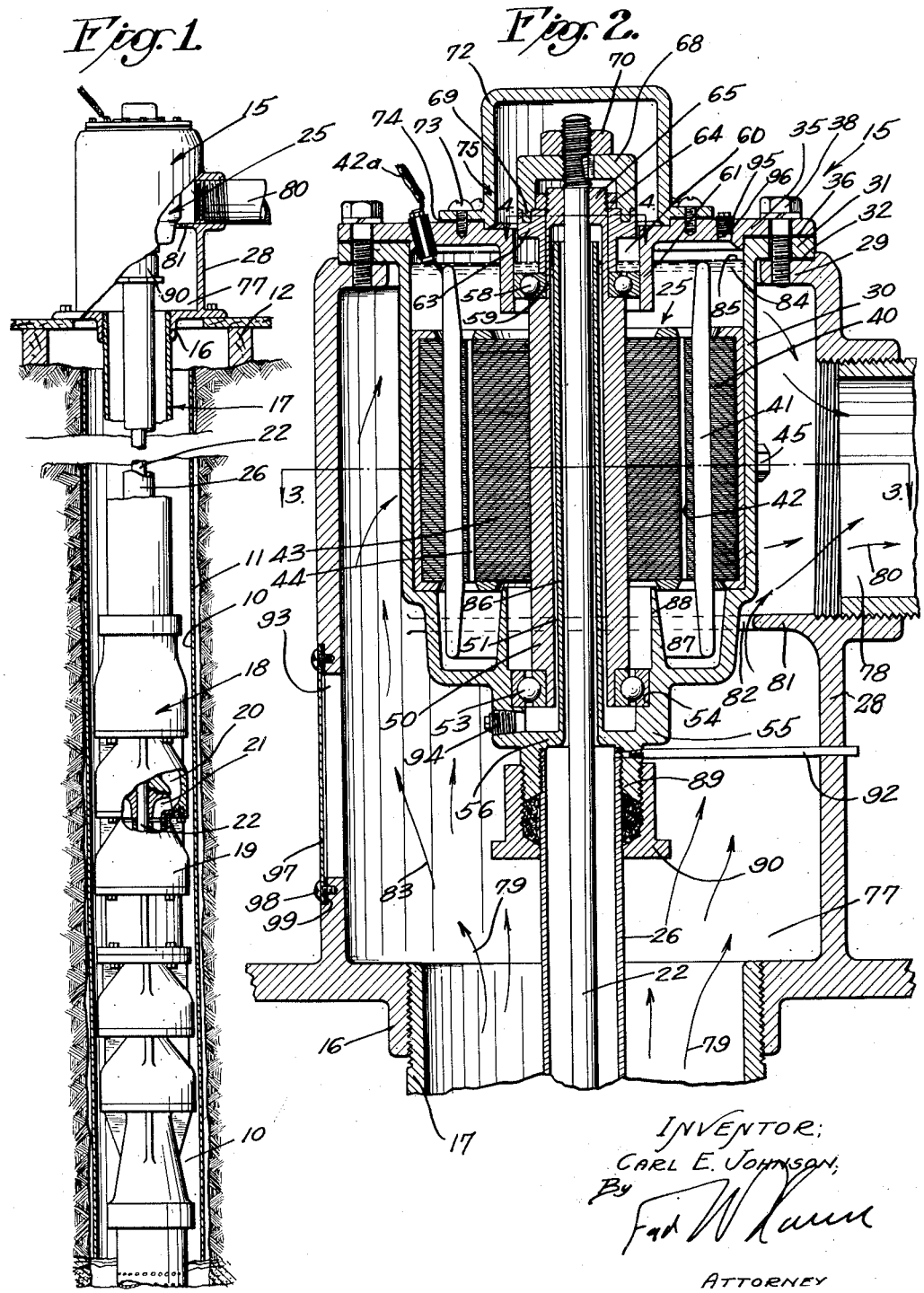

INVENTOR:
CARL E. JOHNSON,
By
ATTORNEY.

Patented Feb. 8, 1938

2,107,481

UNITED STATES PATENT OFFICE 2,107,481

WATER COOLED MOTOR

Carl E. Johnson, Pasadena, Calif., assignor to Sterling Electric Motors, Inc., Los Angeles, Calif., a corporation of California Application February 20, 1928, Serial No. 255,723

17 Claims. (Cl. 103—102)

My invention relates to the deep-well pumping art, and more particularly to a novel construction and placement of an electric motor used in the deep-well turbine art.

Ordinary deep-well turbine pump installations have a pump head situated at the surface of the ground directly above the well. Extending downward from the pump head is a discharge pipe which holds a pump unit at the lower end thereof. This pump unit has one or more impellers operating in suitably designed impeller chambers therein, these impellers being mounted on a line shaft which extends upward through the pump head, being journalled at frequent intervals throughout its length in bearings mounted in a shaft tubing surrounding the line shaft. A motor is mounted on top of the pump head, this motor being directly connected to the line shaft. Ordinarily this motor is air-cooled by means of certain fans mounted on the rotor of the motor. I have invented an improved means of cooling such a motor by utilizing the liquid being pumped as a cooling medium. This liquid is almost invariably of a very low temperature, and the cooling effect thereof is so effective that I have found it possible to develop a much larger amount of power from a motor without reaching its permissible rise of temperature than would be the case if the motor were cooled by the ordinary methods.

It is an object of my invention to provide a motor adapted to operate a pump and to be cooled by the medium being pumped.

I accomplish this superior cooling action by placing the motor in a shell which, instead of being above the pump head casing, is situated inside this casing in such a manner that the liquid being pumped is directed in a path around the periphery of the motor shell.

It is an object of my invention to provide a pump head in which the motor is suspended in the path of the liquid passing through the pump head.

It is a further object of my invention to provide a vane for so directing the flow of this liquid that it passes over a substantial portion of the periphery of the motor shell.

I have found that this cooling action may be further assisted by substantially filling the motor shell with a body of liquid so that the rotor thereof operates submerged in this liquid. Such a liquid is preferably an oil of high dielectric strength and one which is not injurious to the motor itself, this liquid serving the triple purpose of lubricating the bearings, forming a dielectric barrier in the motor, and acting as an excellent heat carrier to transfer the heat from the center of the motor to the shell through which the heat passes to be absorbed by the liquid passing therearound.

It is an object of my invention to provide a motor operable in a body of neutral fluid which may lubricate the bearings thereof, form a dielectric barrier therein, and aid the cooling of the motor.

It is highly desirable to prevent any of this neutral liquid from leaving the motor shell. In accomplishing this result, I prefer to use a hollow shaft motor having a tubular member extending upward from the lower portion of the motor shell and through the hollow motor shaft to a point above the level of the neutral liquid. The pump shaft in such an installation extends upward through the tubular member and is secured to the top of the hollow shaft.

It is an object of my invention to provide a motor which may be filled with a neutral liquid without danger of this liquid escaping or being displaced by any other liquid.

It is another object of my invention to provide a hollow shaft motor in which a tubular member extends upward through the shaft to a point above the surface level of a body of neutral liquid in the motor.

It is a further object of my invention to provide a motor construction which is waterproof.

Further objects and advantages of my invention will be made evident hereinafter.

Referring to the drawings,—

Fig. 1 is a utility view showing one use of my invention.

Fig. 2 is a vertical sectional view of the pump head of my invention.

Figure 3:
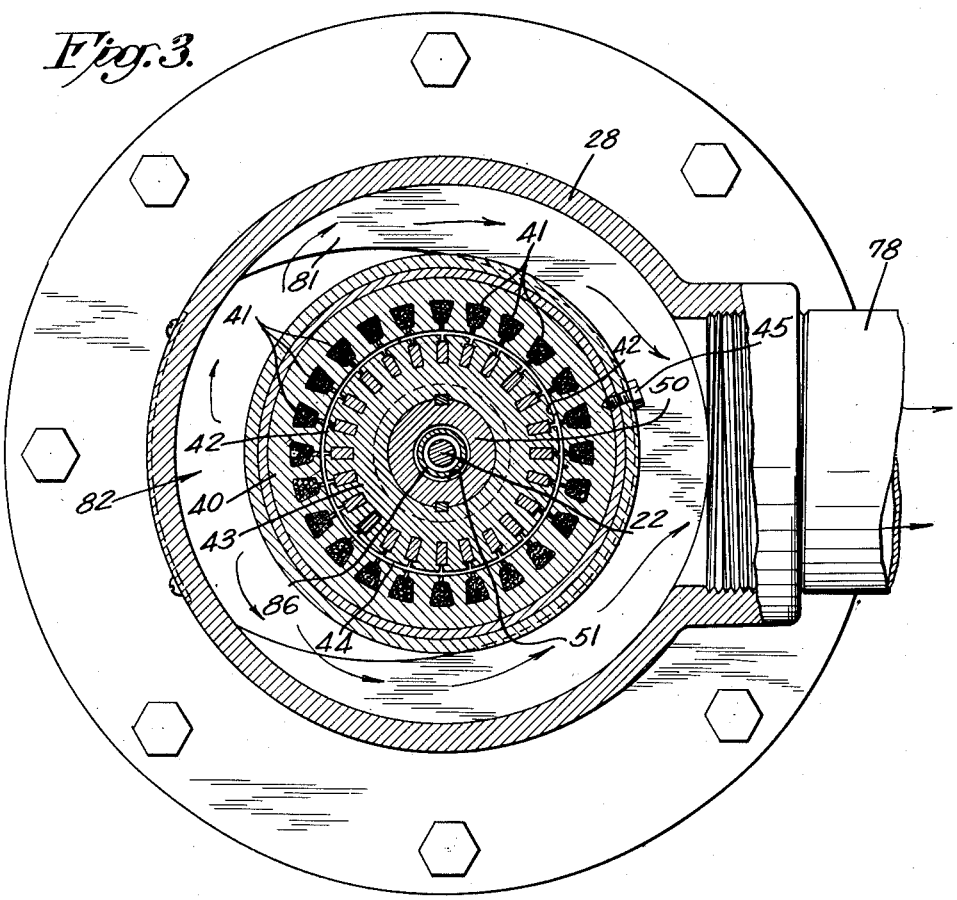
Fig. 3 is a sectional view taken on the line 3—3 of Fig. 2.
Figure 4:
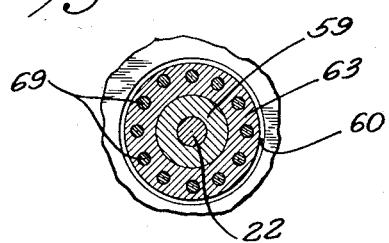
Fig. 4 is a sectional view taken on the line 4—4 of Fig. 2.

The form of my invention illustrated in the drawings is adapted to pump liquid from a well 10 in which a well casing 11 has preferably been set. Mounted on a suitable supporting structure 12 at the surface of the ground is a pump head 15 incorporating certain features of my invention. This pump head has a flange 16 extending downward therefrom, this flange supporting a discharge pipe 17 which extends downward inside the well 10 and which supports a pump unit 18 at the lower end thereof. This pump unit comprises a number of pump sections 19, each of which has an impeller chamber 20 therein. In each impeller chamber is an impeller 21 securely mounted on a line shaft 22, this line shaft extending upward through the discharge pipe 17 and being directly connected to a motor 25 of my invention. It is necessary to journal the line shaft 22 at frequent intervals throughout its length, and this is accomplished by means of bearings mounted at intervals in a shaft tubing 26.

Referring now in particular to Fig. 2 the pump head 15 of my invention comprises a pump head casing 28 which may be either cylindrical, or square, or any other suitable shape. An upper flange 29 is provided on the casing 28 to support a motor shell 30 extending downward inside the casing and which has a flange 31 separated from the flange 29 by a suitable washer 32. A cover plate 35 is mounted above the flange 31, being separated therefrom by a suitable washer 36. The cover plate 35 and the flange 31 are suitably clamped to the flange 29 by means of cap screws 38.

The motor 25 is mounted in the motor shell 30 in a manner to be vertically removable therefrom, and comprises a stator 40 having suitable windings 41 thereon, these windings being adapted to set up a magnetic field in an opening 42 in the stator 40 when leads 42a, suitably bushed in the cover plate, are energized. A rotor 43 is adapted to rotate in the opening 42, there being the customary air gap 44 between the stator and rotor. This stator and rotor may be of any desired type and the laminations thereof may be either held in place by suitable castings, or may be of the "can" type. It is essential that the stator be kept from rotating inside the motor shell 30 and this is accomplished by means of one or more bolts 45 passing through the motor shell and being threaded into the stator 40.

The rotor 43 is securely mounted on a hollow shaft 50, this shaft having an opening 51 extending therethrough. The shaft 50 is suitably journalled at its lower end by a combined radial and thrust bearing 53 which is mounted in a countersunk portion 54 which is formed at the lower end of the motor shell in a cup portion 55 having a radial portion 56 extending inward toward the line shaft 22. The upper end of the hollow shaft 50 is journalled in a radial bearing 58 which engages a reduced diameter portion 59 of the shaft 50 and which may be axially slidable in a cylindrical channel 60 formed by a cylindrical wall 61 extending downward from the cover plate 35.

The radial bearing 58 is clamped on the reduced diameter portion 59 by means of a driving collar 63 which is pressed downward into engagement with the inner race of the bearing 58 by means of a nut 64 threaded on an upper end 65 of the reduced diameter portion 59. The line shaft 22 extends upward through the hollow shaft 50 and through the upper end 65, being keyed to an arbor plate 68. This arbor plate has pins 69 extending downward therefrom, these pins engaging corresponding openings in the upper end of the driving collar 63 so that no rotation can take place between the arbor plate 68 and this driving collar. The extreme upper end of the line shaft 22 is threaded to receive an adjusting nut 70 which may be turned to raise or lower the upper end of the line shaft 22. This adjusting nut is necessary in deep-well installations where it is necessary to accurately adjust the vertical position of the impellers 21 in the impeller chambers 20. Any stretch in the line shaft may be removed by turning the adjusting nut 70 so as to draw the line shaft 22 upward. The adjusting nut 70 also serves to carry the weight of the line shaft, the impellers, and the hydraulic thrust of the impellers when the pump is in operation. An enclosing cap 72 is mounted above the arbor plate and the adjusting nut to suitably protect these pieces of apparatus, this enclosing cap being clamped to the cover plate 35 by screws 73. A washer 74 may be interposed between the enclosing cap 72 and the cover plate 35 to form a waterproof joint therebetween. The cap 72 and the cover plate 35 thus cooperate to form a cover structure 75.

When the motor 25 is operated, the fluid in the well is drawn upward through the pump unit 18 and is then forced upward through that annular space between the shaft tubing 26 and the discharge pipe 17 into a liquid chamber 77 inside the pump head casing 28. The well liquid leaves the liquid chamber 77 through a discharge connection 78 extending outward from one side of the pump head casing 28. It should be noticed that the discharge connection 78 is located at a point substantially opposite the mid-point of the motor 25 so that the well liquid rising through the discharge pipe, as indicated by arrows 79, must come in contact with the periphery of the motor shell 30 before passing outward through the discharge connection 78 as indicated by arrows 80.

Inasmuch as this well liquid is almost invariably of a low temperature, any heat generated in the motor will be absorbed by this stream of cool liquid passing outside and adjacent to the motor shell 30. To increase this cooling action, I provide a deflecting vane 81 which is preferably formed of a shape shown in Figs. 2 and 3 so that it extends inward from the casing 28 to a point nearly adjacent the motor shell 30 at a point near the discharge connection 78, but extends inward an ever-decreasing distance as the distance from the discharge connection 78 is increased. Such a construction leaves a channel 82 between the inner edge of the deflecting vane 81 and the outer periphery of the motor shell 30, this channel being quite small at a point adjacent the discharge connection 78 but increasing in width as the distance from this discharge connection increases. Thus, at a point on the opposite side of the motor shell from the discharge connection 78 the channel 82 widens out to the full distance between the periphery of the motor shell and the pump head casing. Thus, most of the well fluid rising through the discharge pipe 17 will pass through the wider portions of the channel 82 in a direction indicated by arrows 83. In order for this well liquid to reach the discharge connection it must rise above the deflecting vane and then follow a path around the periphery of the motor shell until the discharge connection 78 is reached at which time the liquid may follow the path indicated by the arrows 80. Thus, a very efficient cooling action is obtained.

To still further aid this cooling action I have found it desirable to operate the motor shell 30 substantially filled with a neutral liquid 84. This neutral liquid has an upper surface level 85 which is preferably above the windings 41 and the radial bearing 58. It is preferable to use a neutral liquid which is non-injurious to the windings or other parts of the motor, and one which has a high dielectric strength. This neutral liquid also should preferably be one having good lubricating properties so that the bearings 53 and 58 which are submerged in this liquid will be lubricated at all times. Inasmuch as this neutral liquid fills the air gap 42 of the motor, and is also in surface contact with the ends of the rotor, it is desirable that the viscosity of the liquid be low. I have found that very little energy is dissipated in operating a motor submerged in such a neutral liquid, and the added cooling effect obtained by having a body of liquid through which the heat developed in the air gap 44 and in the rotor 43 may be carried to the motor shell 30 is extremely desirable.

It is, of course, desirable to prevent any of this neutral liquid from escaping from the motor shell 30, and I have found it possible to prevent any leakage therefrom by utilizing a tubular member 86 extending upward from the radial portion 56 through the opening 51 of the motor shaft 50. This tubular member surrounds the line shaft 22 and extends upward to a point above the surface level 85 of the neutral liquid in the motor shell 30. Thus, the neutral liquid will rise in the opening 51 between the hollow shaft and the tubular member 86 to a level substantially the same as the surface level 85. Inasmuch as the tubular member 86 extends above this level it is impossible for any of the neutral liquid to pass downward between the tubular member and the shaft. By suitably galvanizing the shell 30, usually made of cast iron, this shell can be made absolutely liquid-tight, thus preventing the possibility of the pores thereof allowing a portion of the liquid to escape.

Any grit or other foreign matter which might be entrained with the neutral liquid in the shell 30 will drop to the lower portion of the shell through the air gap 44 and will be trapped in a channel 87 formed by a baffle 88 extending upward from the cup portion 55 to a point just below the rotor 43. Thus this sediment or other foreign matter cannot reach the bearing 53.

I find it convenient to support the shaft tubing 26 from the motor shell 30. This I accomplish by means of an internally and externally threaded flange 89 which extends downward from the radial portion 56 of the cup 55. The upper end of the shaft tubing may be screwed into this flange, and a suitable packing gland 90 may be threaded to the flange 89 so as to compress the packing 91 between the gland and the flange, thus forming a fluid-tight fit which prevents any of the well fluid rising through the discharge pipe from entering the shaft tube 26 and possibly injuring the bearings therein. It is the usual practice to lubricate these bearings with oil, and I have found it convenient to place a pipe 92 in communication with the interior of the shaft tubing 26. This may most easily be done by threading the pipe into the flange 89 and allowing this pipe to extend downward through the pump head casing 28. This pipe may perform a dual purpose. It may be utilized for supplying oil to the interior of the shaft tubing to lubricate the bearings. Furthermore, should any liquid rise in the shaft tubing 26, this liquid may drain off through the pipe 92 instead of rising in the space between the tubular member 86 and the line shaft 22 thus reaching the interior of the motor shell 30 and mixing with the neutral liquid 84.

A hand hole 93 formed through the pump head casing 28 allows easy access to the packing gland 90 and also to a plug 94 closing an opening in the lower end of the cup portion 55, this plug being removed when it is desired to drain the neutral fluid from the motor shell 30 and renew this fluid through an opening 95 in the cover plate 35, this opening being normally closed by a plug 96. In order that no well liquid may escape through the hand hole 93, I provide a plate 97 which is suitably secured to the pump head casing as by screws 98. A gasket 99 is preferably clamped between the plate 97 and the casing 28 to form a fluid-tight joint.

I claim as my invention:

1. In combination in a pump head: a pump head casing; a motor shell secured to said pump head casing; a stator in said shell; a rotor adapted to rotate adjacent said stator, said stator and rotor cooperating to define a motor structure; a hollow shaft on which said rotor is mounted; a tubular member mounted in fluid-tight relationship with said shell and extending upward through said hollow shaft to a point above the surface level of a neutral liquid contained in said shell, said surface level being above said motor structure; pump means for forcing a cooling medium in contact with the periphery of said shell in a manner to absorb heat generated in said motor structure and transmitted to said shell through said neutral liquid; and means preventing entry of said cooling medium into the lower end of said tubular member.

2. In combination in a pump head: a pump head casing; a motor shell in but spaced from said pump head casing to provide an annular space; a stator in said shell; a rotor adapted to rotate adjacent said stator, said stator and rotor cooperating to define a motor structure; a vertical hollow shaft on which said rotor is mounted; bearings above and below said rotor for journalling said hollow shaft; a tubular member mounted in fluid-tight relationship with said shell and extending upward through said hollow shaft to a point above the surface level of a neutral liquid contained in said shell, said surface level being above said rotor; and a turbine pump operatively connected to said hollow shaft and forcing a cooling liquid through said annular space.

3. In a pump head, the combination of: a pump head casing providing a chamber communicating with an intake passage and a discharge passage; a shell extending into said chamber and into the path of travel of a stream of liquid entering said intake passage and leaving said discharge passage, there being an annular space between said casing and said shell through which said liquid moves in an arcuate path, said shell providing a chamber open at the top; a motor in said chamber; a cover plate extending across the top of said chamber; an adjusting means accessible from the top of said cover plate; and an enclosing cap for covering said adjusting means.

4. In combination in a pump head for driving a deep well turbine pump: a pump head casing providing a chamber and providing intake and discharge passages communicating with said chamber, said pump forcing liquid through said passages; a motor shell vertically removable from said chamber and suspended therein wholly from its upper end and extending downward in said chamber so as to cooperate with said casing in defining a passage extending completely around the periphery of said motor shell and communicating with said intake and discharge passages to conduct said liquid therebetween in cooling relationship with said shell; a motor in said motor shell; a shaft operatively connecting said motor to said pump; and closure means extending across the upper end of said motor shell and across the upper end of said shaft.

5. In combination in a pump head for driving a deep well turbine pump; a pump head casing providing a chamber and providing intake and discharge passages communicating with said chamber, said pump forcing liquid through said passages; a motor shell in said chamber and in the form of a cup whereby the upper end of said motor shell is open and accessible from the top exterior of said pump head casing; means at the top of said motor shell and engaging said pump head casing to suspend said shell in said chamber from its upper end in spaced relation with the walls of said chamber; a motor positioned in said shell; a shaft on said motor and operatively connected to said pump; and a removable cover means closing the top of said cup-shaped shell and extending across the upper end of said shaft.

6. In combination in a pump head for driving a deep well turbine pump: a pump head casing providing a liquid chamber into which liquid may enter through an intake passage and from which liquid may flow through a discharge passage; a shell supported by said pump head casing and extending into said liquid chamber to a point below said discharge passage, there being an annular space between said shell and the walls of said liquid chamber; a motor in said shell and operatively connected to said pump to force liquid through said space in cooling relationship with said shell; and means adjacent the lower end of said space for compelling a major portion of said liquid to flow in said space in an arcuate path around said shell before said liquid enters said discharge passage.

7. In a pump head for driving a deep well turbine pump: a casing providing intake and discharge passages; a shell in said casing and spaced therefrom to define an annular passage communicating with said intake and discharge passages; a motor in said shell and operatively connected to said pump to deliver liquid through said intake passage and to the bottom of said annular passage; and baffle means extending partially across said annular passage, the distance thus extended being greater near said discharge passage than at a section removed therefrom to form a channel of varying width through which said liquid passes whereby a major portion of said liquid enters said annular passage at a section on the opposite side of said shell from said discharge passage.

8. A combination as defined in claim 7 in which said shell extends opposite said discharge passage, and in which said baffle means is positioned below said discharge passage but above the lower end of said shell.

9. In combination: a pump head casing positioned at the top of a well and providing a chamber through which the pumped liquid may pass; a shell positioned in said casing and in the path of travel of said pumped liquid whereby said shell is cooled thereby; a motor in said shell and positioned in a body of neutral liquid therein, said motor including a rotor; a hollow shaft carrying said rotor; a line shaft secured to said hollow shaft at a section above the level of said neutral liquid, said line shaft extending downward in said well; a pump operatively connected to said line shaft and forcing liquid through said chamber of said pump head casing; and a tube connected in fluid tight relationship with said shell and extending upward in the annular space between said line shaft and the inner wall of said hollow shaft to a point above the level of said neutral liquid.

10. In a pump head for a deep-well turbine pump, the combination of: a pump head casing providing a chamber and intake and discharge passages communicating with said chamber, said turbine pump forcing a stream of cooling liquid through said passages and said chamber; a shell extending into said chamber and into the path of travel of said stream of liquid entering said intake passage and leaving said discharge passage, there being an annular space between said casing and said shell through which said liquid moves in an arcuate path; an oil-filled electric motor in said shell; a shaft operatively connecting said electric motor and said pump; and means above said discharge passage for suspending said shell in said casing.

11. A combination as defined in claim 10 in which said last-named means includes a flange at the upper end of said pump head casing, a flange at the upper end of said motor shell and engaging the flange of said pump head casing in a manner to suspend said motor shell in said pump head casing, and including a cover structure extending over said motor shell and over the upper end of said shaft.

12. A combination as defined in claim 10 in which said last-named means includes a flange at the upper end of said pump head casing, a flange at the upper end of said motor shell and engaging the flange of said pump head casing in a manner to suspend said motor shell in said pump head casing, including a cover structure extending over said motor shell and over the upper end of said shaft, and including means passing through said cover structure and said flanges for securing said cover structure and said motor shell to said pump head casing.

13. In a pump head for a pump, the combination of: a pump head casing providing a chamber and intake and discharge passages communicating with said chamber, said pump forcing a stream of cooling liquid through said passages and said chamber; a shell extending into said chamber and into the path of travel of said stream of liquid entering said intake passage and leaving said discharge passage, there being an annular space between said casing and said shell through which said liquid moves in an arcuate path; an electric motor in said shell; a shaft operatively connecting said electric motor and said pump; and means above said discharge passage for suspending said shell in said casing.

14. An electric motor drive structure arranged to be connected to the top of a well column to supply motive power to a pump in the well, comprising a double walled shell having a reentrant wall that forms an interior and an exterior chamber in the shell, the interior chamber being open at the top, means for connecting the exterior chamber to the top of the well column in such manner that the liquid pumped passes into said exterior chamber, a vertical electric motor in the interior chamber and having windings in heat exchanging relation to the reentrant wall, and means for maintaining the two chambers against fluid exchange.

15. An electric motor drive structure arranged to be connected to the top of a well column to supply motive power to a pump in the well, comprising a double walled shell having a reentrant wall that forms an interior and an exterior chamber in the shell, the interior chamber being open at the top, means for connecting the exterior chamber to the top of the well column in such manner that the liquid pumped passes into said exterior chamber, a vertical electric motor in the interior chamber and having windings in heat exchanging relation to the reentrant wall, means for maintaining the two chambers against fluid exchange, and a cover for the interior chamber providing a bearing at the upper end of the motor.

16. An electric motor drive structure arranged to be connected to the top of a well column to supply motive power to a pump in the well, comprising a double walled shell having a reentrant wall that forms an interior and an exterior chamber in the shell, the interior chamber being open at the top, means for connecting the exterior chamber to the top of the well column in such manner that the liquid pumped passes into said exterior chamber, a vertical electrical motor in the interior chamber and having windings in heat exchanging relation to the reentrant wall, means for maintaining the two chambers against fluid exchange, the inner chamber having an upper and a lower portion, the upper portion housing the motor, the lower portion forming a pocket, and means supported in the pocket forming a lower bearing.

17. In combination in a pump head for driving a pump: a pump head casing providing a chamber and providing intake and discharge passages communicating with said chamber, said pump forcing liquid through said passages; a motor shell in said chamber and in the form of a cup whereby the upper end of said motor shell is open and accessible from the top exterior of said pump head casing; means at the top of said motor shell and engaging said pump head casing to suspend said shell in said chamber from its upper end in spaced relation with the wall of said chamber; a motor positioned in said shell; a shaft on said motor and operatively connected to said pump; and a removable cover means closing the top of said cup-shaped shell and extending across the upper end of said shaft.

CARL E. JOHNSON.